(12) United States Patent
Dadheech et al.

(10) Patent No.: US 11,196,045 B2
(45) Date of Patent: Dec. 7, 2021

(54) PLASMA PRETREATMENT ON CURRENT COLLECTORS FOR THIN FILM LITHIUM METALLIZATION

(71) Applicant: GM GLOBAL TECHNOLOGY OPERATIONS LLC, Detroit, MI (US)

(72) Inventors: Gayatri V. Dadheech, Bloomfield Hills, MI (US); Li Yang, Troy, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 635 days.

(21) Appl. No.: 15/886,396

(22) Filed: Feb. 1, 2018

(65) Prior Publication Data
US 2019/0237758 A1 Aug. 1, 2019

(51) Int. Cl.
*H01M 4/38* (2006.01)
*H01M 4/04* (2006.01)
(Continued)

(52) U.S. Cl.
CPC ......... *H01M 4/382* (2013.01); *H01M 4/0419* (2013.01); *H01M 4/661* (2013.01);
(Continued)

(58) Field of Classification Search
CPC .................................................... H01M 4/886
See application file for complete search history.

(56) References Cited

U.S. PATENT DOCUMENTS 6,558,848 B1 * 5/2003 Kobayashi ............. H01M 4/80
429/241
7,736,805 B2 6/2010 Nazri et al.
(Continued)

FOREIGN PATENT DOCUMENTS

CN 1143839 A 2/1997
CN 103858195 A 6/2014
(Continued)

OTHER PUBLICATIONS

Li Yang et al.; U.S. Appl. No. 15/237,378, filed Aug. 15, 2016 entitled "Gel Electrolytes and Precursors Thereof"; 23 pages.
(Continued)

Primary Examiner — Edward J. Schmiedel
(74) Attorney, Agent, or Firm — Harness, Dickey & Pierce, P.L.C.

(57) ABSTRACT

Methods of forming a lithium-based negative electrode assembly are provided. A surface of a metal current collector is treated with a reducing plasma gas so that after the treating, a treated surface of the metal current collector is formed that has a contact angle of less than or equal to about 10° and has less than or equal to about 5% metal oxides. The metal current collector may include a metal, such as copper, nickel, and iron. A lithium metal is applied to the treated surface of the metal current collector in an environment substantially free from oxidizing species. Lithium metal flows over and adheres to the treated surface to form a layer of lithium. The layer of lithium may be a thin layer having a thickness of ≥about 1 μm to ≤about 75 μm thus forming the lithium metal negative electrode assembly.

18 Claims, 2 Drawing Sheets

(51) Int. Cl.
*H01M 4/66* (2006.01)
*H01M 10/0525* (2010.01)
*H01M 4/139* (2010.01)
*H01M 4/02* (2006.01)

(52) U.S. Cl.
CPC ........ *H01M 10/0525* (2013.01); *H01M 4/139* (2013.01); *H01M 2004/027* (2013.01)

(56) References Cited

U.S. PATENT DOCUMENTS

| | | | |
|---|---|---|---|
| 8,101,152 B1 | 1/2012 | Halalay et al. |
| 8,119,288 B2 | 2/2012 | Zhamu et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 8,927,149 B2 | 1/2015 | Ohara et al. |
| 8,945,772 B2 | 2/2015 | Kawakami et al. |
| 8,974,946 B2 | 3/2015 | Cai et al. |
| 9,012,075 B2 | 4/2015 | Verbrugge et al. |
| 9,034,519 B2 | 5/2015 | Xiao et al. |
| 9,093,705 B2 | 7/2015 | Xiao et al. |
| 9,129,754 B2 | 9/2015 | Kuriki et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,252,411 B2 | 2/2016 | Abd Elhamid et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,373,829 B2 | 6/2016 | Xiao et al. |
| 9,373,834 B2 | 6/2016 | Yamakaji et al. |
| 9,379,374 B2 | 6/2016 | Liu et al. |
| 9,490,472 B2 | 11/2016 | Nanba et al. |
| 9,583,767 B2 | 2/2017 | Verbrugge et al. |
| 9,647,254 B2 | 5/2017 | Dadheech et al. |
| 9,742,028 B2 | 8/2017 | Zhou et al. |
| 9,923,189 B2 | 3/2018 | Xiao |
| 9,929,435 B2 | 3/2018 | Cai et al. |
| 10,608,241 B2 | 3/2020 | Balogh et al. |
| 2003/0138701 A1* | 7/2003 | Tsukiashi ............ H01M 2/162 429/250 |
| 2004/0209159 A1* | 10/2004 | Lee .................... H01M 10/052 429/137 |
| 2008/0261116 A1 | 10/2008 | Burton et al. |
| 2009/0325071 A1 | 12/2009 | Verbrugge et al. |
| 2011/0159364 A1 | 6/2011 | Nishinaka et al. |
| 2012/0094178 A1 | 4/2012 | Loveridge et al. |
| 2012/0100403 A1 | 4/2012 | Wang et al. |
| 2012/0229096 A1 | 9/2012 | Nazri |
| 2012/0315548 A1* | 12/2012 | Fujikawa ............ H01M 4/70 429/330 |
| 2012/0328927 A1 | 12/2012 | Timmons et al. |
| 2013/0099159 A1 | 4/2013 | Halalay et al. |
| 2013/0157125 A1 | 6/2013 | Sachdev et al. |
| 2013/0177804 A1 | 7/2013 | Verbrugge et al. |
| 2013/0260236 A1 | 10/2013 | Park et al. |
| 2013/0323595 A1 | 12/2013 | Sohn et al. |
| 2015/0056387 A1 | 2/2015 | Dadheech et al. |
| 2015/0056493 A1 | 2/2015 | Dadheech et al. |
| 2015/0166348 A1 | 6/2015 | Ikenuma et al. |
| 2015/0236324 A1 | 8/2015 | Xiao et al. |
| 2015/0280221 A1 | 10/2015 | Abdelsalam et al. |
| 2015/0303000 A1 | 10/2015 | Okuno et al. |
| 2015/0349307 A1 | 12/2015 | Dadheech et al. |
| 2016/0020491 A1 | 1/2016 | Dai et al. |
| 2016/0141598 A1 | 5/2016 | Dai et al. |
| 2016/0172665 A1 | 6/2016 | Zhou et al. |
| 2016/0172681 A1 | 6/2016 | Yang et al. |
| 2016/0172706 A1 | 6/2016 | Xiao et al. |
| 2016/0172710 A1 | 6/2016 | Liu et al. |
| 2016/0218342 A1 | 7/2016 | Xiao et al. |
| 2016/0218387 A1 | 7/2016 | Tajima |
| 2016/0254567 A1 | 9/2016 | Cai et al. |
| 2017/0047588 A1 | 2/2017 | Mukherjee et al. |
| 2017/0162859 A1 | 6/2017 | Yang et al. |
| 2017/0214079 A1 | 7/2017 | Dai et al. |
| 2017/0222210 A1 | 8/2017 | Xiao |
| 2017/0271678 A1 | 9/2017 | Yang et al. |
| 2017/0288230 A1 | 10/2017 | Yang et al. |
| 2017/0338490 A1 | 11/2017 | Xiao et al. |
| 2018/0048022 A1 | 2/2018 | Yang et al. |
| 2018/0062206 A1 | 3/2018 | Yang et al. |
| 2018/0108952 A1 | 4/2018 | Yang et al. |
| 2018/0309165 A1 | 10/2018 | Yersak et al. |
| 2018/0309166 A1 | 10/2018 | Yersak et al. |
| 2018/0375148 A1 | 12/2018 | Yersak et al. |
| 2019/0044134 A1 | 2/2019 | Liu et al. |
| 2019/0058210 A1 | 2/2019 | Dai et al. |
| 2019/0058211 A1 | 2/2019 | Yang et al. |
| 2019/0067675 A1 | 2/2019 | Xiao |
| 2019/0067744 A1 | 2/2019 | Xiao et al. |
| 2019/0089006 A1 | 3/2019 | Yang et al. |
| 2019/0237758 A1 | 8/2019 | Dadheech et al. |
| 2019/0312255 A1 | 10/2019 | Dai et al. |
| 2019/0319259 A1 | 10/2019 | Balogh et al. |

FOREIGN PATENT DOCUMENTS

| | | |
|---|---|---|
| CN | 107022784 A | 8/2017 |
| CN | 107195857 A | 9/2017 |
| CN | 110112368 A | 8/2019 |
| CN | 110391399 A | 10/2019 |
| DE | 102017101740 A1 | 8/2017 |
| DE | 102017105307 A1 | 9/2017 |
| DE | 102019102037 A1 | 8/2019 |
| DE | 102019109376 A1 | 10/2019 |
| WO | 2015176241 A1 | 11/2015 |

OTHER PUBLICATIONS

Li Yang et al.; U.S. Appl. No. 15/295,600, filed Oct. 17, 2016 entitled "Three-Electrode Test Cell"; 33 pages.

Fang Liu et al.; U.S. Appl. No. 15/666,170, filed Aug. 1, 2017 entitled "Conformal Coating of Lithium Anode Via Vapor Deposition for Rechargeable Lithium Ion Batteries"; 52 pages.

Li Yang et al.; U.S. Appl. No. 15/677,249, filed Aug. 15, 2017 entitled "Ether-Based Electrolyte System Improving or Supporting Anodic Stability of Electrochemical Cells Having Lithium-Containing Anodes"; 42 pages.

Fang Dai et al.; U.S. Appl. No. 15/677,760, filed Aug. 15, 2017 entitled "Lithium Metal Battery With Hybrid Electrolyte System"; 48 pages.

Xingcheng Xiao et al.; U.S. Appl. No. 15/692,107, filed Aug. 31, 2017 entitled "Methods of Applying Self-Forming Artificial Solid Electrolyte Interface (SEI) Layer To Stabilize Cycle Stability of Electrodes in Lithium Batteries"; 45 pages.

Li Yang et al.; U.S. Appl. No. 15/710,326, filed Sep. 20, 2017 entitled "Hybrid Metal-Organic Framework Separators for Electrochemical Cells"; 46 pages.

Kozen, Alexander C et al.; "Next-Generation Lithium Metal Anode Engineering Via Atomic Layer Deposition"; ACS Nano; vol. 9; No. 6; May 13, 2015; pp. 5884-5892.

Yan, Kai et al.; "Selective deposition and stable encapsulation of lithium through heterogeneous seeded growth", *Nature Energy*, vol. 1, 2016, 8 pages.

First Office Action for Chinese Application No. CN201910068579.8 dated Sep. 26, 2021 which is a publication of counterpart Chinese Patent Application No. 201910068579.8 to the present application; 7 pages.

* cited by examiner

PLASMA PRETREATMENT ON CURRENT COLLECTORS FOR THIN FILM LITHIUM METALLIZATION

INTRODUCTION

This section provides background information related to the present disclosure which is not necessarily prior art.

The present disclosure relates to methods of forming lithium-based negative electrode assemblies for an electrochemical cell by plasma pretreating metal current collectors followed by lithium metallization.

High-energy density, electrochemical cells, such as lithium-ion batteries can be used in a variety of consumer products and vehicles, such as Hybrid Electric Vehicles (HEVs) and Electric Vehicles (EVs). Typical lithium-ion and lithium sulfur batteries include a first electrode, a second electrode, an electrolyte material, and a separator. One electrode serves as a positive electrode or cathode (on discharge) and another serves as a negative electrode or anode (on discharge). A stack of battery cells may be electrically connected to increase overall output. Conventional rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \leq x \leq 3$, such as $Li_4Ti_5O_{12}$ (LTO). The negative electrode may also be made of metallic lithium (often referred to as a lithium metal anode (LMA)), so that the electrochemical cell is considered a lithium metal battery or cell. Metallic lithium for use in the negative electrode of a rechargeable battery has various potential advantages, including having the highest theoretical capacity and lowest electrochemical potential. Thus, batteries incorporating lithium metal anodes can have a higher energy density that can potentially double storage capacity, so that the battery may be half the size, but still last the same amount of time as other lithium ion batteries. Lithium metal batteries are thus one of the most promising candidates for high energy storage systems.

However, lithium metal batteries can potentially exhibit unreliable or diminished performance leading to the potential for diminished electrochemical cell lifetime. One issue that arises is the high level of reactivity of the lithium metal, which can result in interfacial instability and undesired reactions with various species that the lithium metal is exposed to both during manufacture and operation of the electrochemical cell (e.g., potentially leading to dendrite formation). Another potential source of diminished performance in lithium metal batteries can be related to weak long-term adhesion of lithium metal to a metal current collector, which can result in undesirable increases in resistance and impedance over time when the lithium-based negative electrode is used in an electrochemical cell. Accordingly, it would be desirable to develop reliable, high-performance lithium-containing negative electrode materials for use in high energy electrochemical cells that can minimize diminished performance over time (e.g., to minimize increases in resistance/impedance and capacity fade for long-term use).

SUMMARY

This section provides a general summary of the disclosure, and is not a comprehensive disclosure of its full scope or all of its features.

In various aspects, the present disclosure provides a method of forming a lithium-based negative electrode. The method includes treating a surface of a metal current collector with a reducing plasma gas so that after the treating, a treated surface of the metal current collector is formed. The treated surface may have a contact angle of less than or equal to about 10° and further have less than or equal to about 5% metal oxides. The metal in the metal current collector is selected from the group consisting of: copper (Cu), nickel (Ni), iron (Fe), and combinations thereof. The method also includes applying lithium metal to the treated surface of the metal current collector in an environment substantially free from oxidizing species. The lithium metal flows over and adheres to the treated surface to form a layer of lithium having a thickness of greater than or equal to about 1 micrometer (μm) to less than or equal to about 75 μm thus forming the lithium metal negative electrode.

In one aspect, the reducing plasma gas includes a molecule selected from the group consisting of: argon (Ar), nitrogen ($N_2$), hydrogen gas ($H_2$), ammonia ($NH_3$), and combinations thereof.

In one aspect, the treating of the surface with the reducing plasma gas employs a plasma source selected from the group consisting of: a high energy plasma generated by a microwave plasma source, a low pressure plasma, an inductively coupled plasma, and combinations thereof.

In one aspect, after the treating and prior to the applying, the metal current collector is disposed on a heated stage having a temperature of greater than or equal to about 50° C. to less than or equal to about 120° C.

In one aspect, the treating and the applying are conducted in the same reaction chamber.

In one aspect, the treating of the surface of the metal current collector with a reducing plasma gas is conducted with a high energy plasma generated by a 13.56 MHz radio frequency (RF) plasma source or a 2.48 GHz microwave plasma source.

In one aspect, the current collector is a film or foil. The current collector may have a thickness of greater than or equal to about 2 micrometers (μm) to less than or equal to about 30 μm. The lithium metal applied to the treated surface of the metal current collector may be a lithium film or foil having a thickness of greater than or equal to about 5 μm to less than or equal to about 75 μm.

In one aspect, during at least a portion of the applying, pressure is applied to the layer of lithium.

In various aspects, the present disclosure provides a method of forming a lithium metal negative electrode that includes treating a surface of a current collector including copper with a reducing plasma gas. After the treating, a treated surface of the current collector has a contact angle of less than or equal to about 10° and has less than or equal to about 5% copper oxides. The method also includes heating the current collector having the treated surface to a temperature of greater than or equal to about 50° C. to less than or equal to about 120° C. The lithium metal is applied to the treated surface of the current collector in an environment substantially free from oxidizing species and having a water content of less than or equal to about 1% by mass. The lithium metal flows over and adheres to the treated surface to form a layer of lithium. The layer of lithium may have a thickness of greater than or equal to about 1 micrometer (μm) to less than or equal to about 75 μm so as to form the lithium metal negative electrode.

In one aspect, the reducing plasma gas has a composition including a molecule selected from the group consisting of: argon (Ar), nitrogen ($N_2$), hydrogen gas ($H_2$), ammonia ($NH_3$), and combinations thereof.

In one aspect, the treating of the surface with the reducing plasma gas employs a plasma source selected from the group consisting of: a high energy plasma generated by a microwave plasma source, a low pressure plasma, an inductively coupled plasma, and combinations thereof.

In one aspect, the treating and the applying are conducted in the same reaction chamber.

In one aspect, the treating the surface of a metal current collector with a reducing plasma gas is conducted with a high energy plasma generated by a 13.56 MHz radio frequency (RF) plasma source or a 2.48 GHz microwave plasma source.

In one aspect, the current collector is a film or foil having a thickness of greater than or equal to about 2 μm to less than or equal to about 30 μm. Further, the layer of lithium metal applied to the treated surface of the metal current collector is a lithium film or foil, which may have a thickness of greater than or equal to about 5 μm to less than or equal to about 75 μm.

In one aspect, during at least a portion of the applying, pressure is applied to the layer of lithium.

In yet other aspects, the present disclosure provides a lithium-based negative electrode assembly. The assembly includes a metal current collector having a treated surface with a contact angle of less than or equal to about 10° and having less than or equal to about 5% metal oxides. The metal in the metal current collector is selected from the group consisting of: copper (Cu), nickel (Ni), iron (Fe), and combinations thereof. The assembly also includes a lithium metal layer disposed on the treated surface having a thickness of greater than or equal to about 1 micrometer (μm) to less than or equal to about 75 μm. An interface defined between the treated surface and the lithium metal layer has a nucleation overpotential that is reduced by greater than or equal to 10% as compared to a comparative interface between lithium metal and a metal current collector lacking the treated surface.

In one aspect, the metal current collector includes copper and the treated surface has less than or equal to about 5% copper oxides.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure contemplates a method of making an electrode assembly (e.g., a negative electrode including an electroactive material layer and a metal current collector) for an electrochemical cell. An electrochemical cell may include a battery, capacitor, or super capacitor, by way of example. Suitable batteries may include lithium-ion, lithium sulfur, and lithium-lithium symmetrical batteries. High-energy density, electrochemical cells, such as lithium-based batteries can be used in a variety of consumer products and vehicles. Examples of devices in which the electrochemical cells can be used include an electric motor for a hybrid vehicle or an all-electrical vehicle, a laptop computer, a tablet computer, a cellular phone, and cordless power tools or appliances, by way of non-limiting example.

In certain aspects, the present disclosure thus provides methods of forming a lithium-based negative electrode. The lithium-based negative electrode is an assembly that includes a metal current collector and an electroactive lithium metal layer disposed on a surface of the metal current collector. The metal in the metal current collector is optionally selected from the group consisting of: copper (Cu), nickel (Ni), iron (Fe), alloys, and combinations thereof. The current collector may be formed of an iron alloy, such as stainless steel, by way of example. Copper and nickel are particularly challenging metal substrates on which to form a lithium metal layer, as they typically do not react with lithium at room temperature and have a substantial nucleation overpotential. Furthermore, these metals have a propensity to form metal oxides that can potentially further inhibit the formation of an even layer of lithium metal with good adhesion.

Current techniques for forming lithium metal layers on such metal current collectors involve treating with strong solvents (e.g., toluene, acetone, and the like) and acids (e.g., sulfuric acid), often involving multiple, laborious processing steps. However, even after treatment with such techniques, a substantial amount of metal oxides may still remain on the surface of the treated current collector, diminishing the wettability of the lithium metal on the current collector surface, which can ultimately impact the potential strength of the bond between the lithium metal and the metal current collector surface. Such techniques do not reduce nucleation overpotential to the extent desired. Additionally, thicker layers of lithium are required to ensure even surface coverage. If application of the lithium to the current collector is uneven and/or the bond between the lithium metal and current collector is not robust, over time, the resistance and/or impedance of the negative electrode can increase.

Thus, in accordance with various aspects of the present disclosure, the methods entail treating a surface of a metal current collector with a reducing plasma gas. As described in greater detail below, a plasma energy source can generate a plasma-based reducing gas. In certain aspects, the reducing plasma gas has a composition comprising one or more reductant or inert molecules, such as a molecule selected from the group consisting of: argon (Ar), nitrogen ($N_2$), hydrogen gas ($H_2$), ammonia ($NH_3$), and combinations thereof. As discussed further below, oxidizing species desirably may be absent in the reducing plasma gas. The treating of the surface with the reducing plasma gas may employ a plasma source selected from the group consisting of: a high energy plasma generated by a microwave plasma source, a low pressure plasma, an inductively coupled plasma, and combinations thereof In one variation, described further below, the treating the surface of a metal current collector with a reducing plasma gas is conducted by using a high energy plasma generated by a 13.56 MHz radio frequency (RF) plasma source or a 2.48 GHz microwave plasma source.

A plasma-containing reactive gas is one that has free electrons, positive ions and other chemical species, which desirably modifies the metal current collectors (e.g., copper foils) by reducing the energy barriers by increasing surface energy, as well as improving wettability and adhesion. Plasma provides the energy necessary to dissociate a carrier gas into excited ions to provide ion bombardment of the metal current collector, which can be followed by lithium metallization, as discussed further below. The treatment with plasma-based reducing gas can serve one or more of the following functions: to clean the surface of the current collector, reduce metal oxides present on the surface of the metal current collector to enhance wettability, and modify the metal interface to promote lithium metallization. The metal interface can be modified in a manner that overcomes the nucleation overpotential for lithium deposition, increases surface energy, and thus improves wettability of lithium. A plasma treated clean surface enhances wettability and allows for lithium to flow and deposit as a thin film. Thus, the treating with plasma gas reduces the nucleation overpotential for lithium metal on the treated surface.

Figure 4:
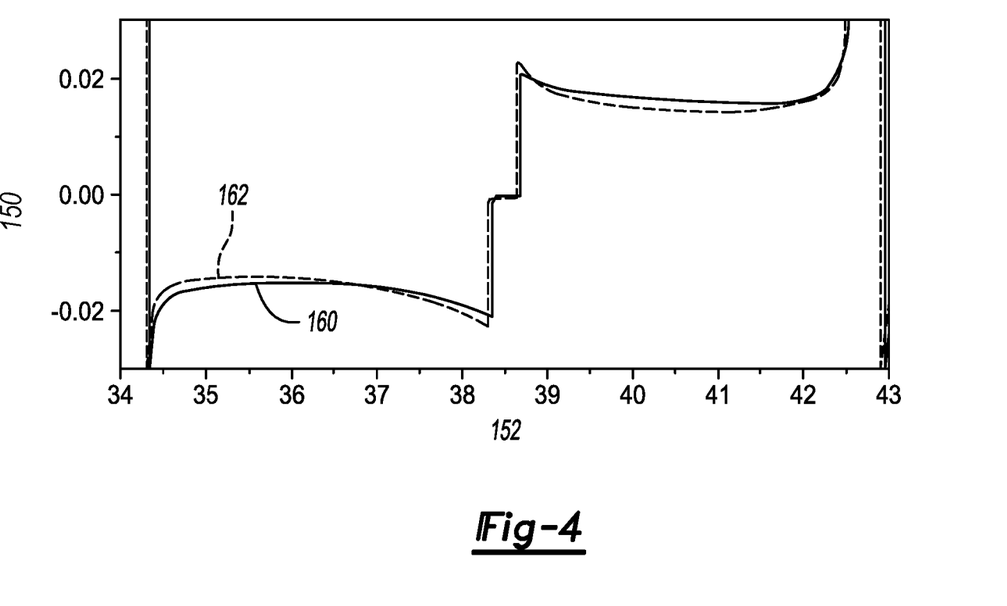
FIG. 4 shows comparative performance (voltage (V) over time (hours)) for a first battery incorporating a lithium-based negative electrode assembly formed in accordance with certain aspects of the present disclosure as compared to a second battery incorporating a lithium-based negative electrode not having any plasma treatment.

FIG. 4, which will be described in more detail below, shows such a reduction. In FIG. 4, comparative performance (voltage (V) labeled 150 versus time (hours) labeled 152) is shown for a first battery incorporating a lithium-based negative electrode assembly formed in accordance with certain aspects of the present disclosure (represented by curve 160) as compared to a second battery incorporating a lithium-based negative electrode not having any plasma treatment (represented by curve 162). As can be seen, a reduction in nucleation overpotential occurs because curve 162 is above curve 160 in FIG. 4 at shorter times (e.g., near an abscissa value of 34.5), with the difference between the two curves representing the overpotential reduction. For example, the reduction in nucleation overpotential at 34.5 is a reduction of about 10% (2 mV reduction/20 mV total overpotential). In certain aspects, the reduction in nucleation potential is greater than or equal to 10% for an interface between a metal current collector treated with plasma gas and lithium metal, as compared to a comparative interface with a metal current collector that has not been plasma treated and lithium metal.

In certain aspects, as will be described further herein, after treating with the reducing plasma gas, a treated surface of the metal current collector has a contact angle that is reduced as compared to a contact angle of a metal current collector that has not been treated with plasma gas. In certain aspects, after treating the surface of the current collector with a reducing plasma gas in accordance with certain aspects of the present disclosure, the treated surface may have a contact angle after treatment of less than or equal to about 10°, optionally less than or equal to about 9°, optionally less than or equal to about 8°, optionally less than or equal to about 7°, optionally less than or equal to about 6°, optionally less than or equal to about 5°, and in certain variations, optionally less than or equal to about 4°. Such a contact angle maybe a static contact angle, where a sessile drop measurement technique using a 5 microliter drop is disposed on the surface and measured.

Further, after treating with the reducing plasma gas, the treated surface may have less than or equal to about 10% metal oxides by mass present along the treated and exposed surface, optionally less than or equal to about 5% by mass metal oxides, optionally less than or equal to about 4% by mass metal oxides, optionally less than or equal to about 3% by mass metal oxides, and in certain variations optionally less than or equal to about 2% by mass metal oxides. Such metal oxides may be measured from the exposed surface towards the interior region at a depth of about 500 nm, by way of example.

After treating the metal current collector surface with the reducing plasma gas, the method further includes applying lithium metal to the treated surface of the metal current collector in an environment having minimal oxidizing species. Oxidizing species may include oxygen-containing species, such as oxygen ($O_2$), carbon monoxide (CO), carbon dioxide ($CO_2$), nitrogen oxides ($NO_x$), water ($H_2O$) and the like. In certain variations, the environment in which the applying of the lithium occurs is substantially free of certain compounds or species that are oxidizing species. The term "substantially free" as referred to herein is intended to mean that the compound or species is absent to the extent that undesirable and/or detrimental effects are negligible or non-existent, here promoting formation of metal oxides on the surface of the current collector or undesirably reacting with the lithium metal to form oxides.

In certain aspects, an environment that is "substantially free" of such compounds comprises less than or equal to about 1% by weight, optionally less than or equal to about 0.5% by weight, optionally less than or equal to about 0.1% by weight, and in certain preferred aspects, 0% by weight of the undesired oxidizing species. In certain variations, the environment has a total water content of less than or equal to about 1% by weight, optionally less than or equal to about 0.5% by weight, optionally less than or equal to about 0.1% by weight, and in certain preferred aspects, a total water content of the environment is 0% by weight. The environment having minimal oxidizing species or that is substantially free of oxidizing species helps to reduce or diminish undesired reactions with highly reactive lithium as it is applied, which is ordinarily not a concern in typical processes when cleaning metals, like copper, nickel, or steel being treated with plasma gases, for example, for etching or cleaning. In certain aspects, the environment prior to the applying of the lithium metal—during the plasma treatment—may also be substantially free of any oxidizing species.

The treating and the applying may be conducted in the same reaction chamber. Heat may be applied to the metal current collector and/or the source of lithium metal during the applying process. The source of the lithium metal and the current collector may be further compressed together under applied pressure. Suitable methods of applying pressure may include use of rollers, platens, blades, and the like. The heating, and optional application of pressure, facilitates good adhesion and wetting of the lithium metal onto the treated surface of the current collector.

In certain aspects, the heating and optional applying of pressure can be conducted in a batch process at a duration of greater than or equal to about 15 minutes, optionally greater than or equal to about 20 minutes, optionally greater than or equal to about 25 minutes, and in certain variations, optionally greater than or equal to about 30 minutes. In certain aspects, the heating and optional applying of pressure can be conducted for a duration of greater than or equal to about 15 minutes to less than or equal to about 60 minutes, optionally greater than or equal to about 20 minutes to less than or equal to about 45 minutes. In certain other aspects, the heating and optional applying of pressure can be conducted for a continuous process at a duration of greater than or equal to about 1 minute, optionally greater than or equal to about 5 minutes, and in certain variations, optionally greater than or equal to about 10 minutes. Thus, in a continuous process, the heating and optional applying of pressure can be conducted for greater than or equal to about 1 minute to less than or equal to about 10 minutes.

While suitable temperatures for the heating step depend on the materials used (e.g., on the specific lithium ion source materials and the current collector materials) as appreciated by those of skill in the art, in certain variations, the heating is conducted at a temperature of less than or equal to about 170° C., optionally less than or equal to about 150° C., optionally less than or equal to about 125° C., and in certain variations, optionally less than or equal to about 120° C. In certain variations, the heating may be conducted at a temperature of greater than or equal to about 20° C. (e.g., about room temperature) to less than or equal to about 170° C., optionally greater than or equal to about 50° C. to less than or equal to about 150° C., optionally greater than or equal to about 50° C. to less than or equal to about 125° C., and in certain variations, optionally greater than or equal to about 50° C. to less than or equal to about 120° C.

The compressing occurs by applying external pressure or force to the lithium metal source disposed on the metal current collector. In certain variations, the amount of applied pressure may be greater than or equal to about 0.1 MPa (about 15 psig) to less than or equal to about 40 MPa (about 5,800 psig), optionally greater than or equal to about 10 MPa (about 1,450 psig) to less than or equal to about 30 MPa (about 4,350 psig), and in certain variations, about 20 MPa (about 2,900 psig).

In one aspect, after the treating and prior to the applying, the metal current collector may be disposed on a heated stage. The heated stage may have a temperature as listed above, for example, greater than or equal to about 50° C. to less than or equal to about 120° C. In certain aspects, the lithium metal applied to the treated surface of the metal current collector is a lithium film or foil. As it is applied, the lithium metal flows over and adheres to the treated surface to form a continuous layer. In certain variations, the layer forms the lithium metal electroactive layer of the negative electrode. During at least a portion of the applying, if pressure is applied to the source or layer of lithium metal, a smoother and more even lithium metal layer can be formed that is wetted out on and well adhered to the treated surface of the current collector.

In certain variations, a method of forming a lithium metal negative electrode is provided that comprises treating a surface of a current collector comprising copper with a reducing plasma gas to reduce the nucleation overpotential for lithium metal. A reduction in nucleation potential may be greater than or equal to 10% for an interface between a current collector treated with plasma gas and lithium metal, as compared to a comparative interface with a current collector that has not been plasma treated and lithium metal, optionally greater than or equal to 11%, optionally greater than or equal to 12%, optionally greater than or equal to 13%, optionally greater than or equal to 14%, and in certain variations, optionally greater than or equal to 15%.

After the treating, a treated surface of the current collector comprising copper has a contact angle of less than or equal to about 10° and has less than or equal to about 5% copper oxides or any of the values specified above. Surface pretreatment of copper foils and thin films with a reducing plasma gas in accordance with certain aspects of the present disclosure provide the ability to successfully deposit lithium metal in thin layers on a copper foil current collector and to enhance the interface between the copper and lithium metal to provide good long-term performance of the electrochemical cell incorporating such a negative electrode.

The method may also comprise heating the copper-based current collector having the treated surface to a temperature of greater than or equal to about 50° C. to less than or equal to about 120° C. The method may further comprise applying lithium metal to the treated surface of the current collector in an environment substantially free from oxidizing species. The environment may have a water content of less than or equal to about 1% by mass or any of the values specified above. The lithium metal flows over and adheres to the treated surface to form a layer that defines the electroactive material, so as to form the lithium metal negative electrode assembly.

The metal current collector may be a film or foil having a thickness of greater than or equal to about 2 micrometers (μm) to less than or equal to about 30 μm. The source or layer of lithium metal applied to the treated surface of the metal current collector may be a lithium film or foil. In certain aspects, the source or layer of lithium metal may have a thickness of greater than or equal to about 1 μm to less than or equal to about 75 μm, optionally greater than or equal to about 5 μm to less than or equal to about 75 μm or in other aspects, optionally greater than or equal to about 1 μm to less than or equal to about 50 μm. The foil or film may wet out and thin during the application process onto the current collector.

A thickness of the lithium metal layer after being applied may be greater than or equal to about 20 nm to less than or equal to about 100 micrometer (μm). In certain variations, the lithium metal layer applied to the metal current collector may have a thickness of greater than or equal to about 1 μm to less than or equal to about 75 μm, and in certain variations, optionally greater than or equal to about 1 82 m to less than or equal to about 50 μm.

In certain aspects, the reducing plasma gas has a composition like those described above, for example, comprising a molecule selected from the group consisting of: argon (Ar), nitrogen ($N_2$), hydrogen gas ($H_2$), ammonia ($NH_3$), and combinations thereof. The treating of the surface with the reducing plasma gas employs a plasma source selected from the group consisting of: a high energy plasma generated by a microwave plasma source, a low pressure plasma, an inductively coupled plasma, and combinations thereof. The treating and the applying are conducted in the same reaction chamber. The treating of the surface of the metal current collector with a reducing plasma gas may be conducted with a high energy plasma, for example, generated by a 13.56 MHz radio frequency (RF) plasma source or a 2.48 GHz microwave plasma source. Generally, high energetics of a plasma means a relatively high level of ions in the plasma. A typical plasma has $10^{10}$ $cm^3$ of ions in the plasma. High energy plasma would have $10^{11}$ $cm^3$ of ions (e.g., a tenfold higher amount of ions in the plasma). A power level of lower energy plasma can be approximately greater than or equal to about 50 W to less than or equal to about 100 W, as where a high power/high energy plasma can have a power level of greater than or equal to about 100 W to less than or equal to about 5,000 W (5 KW).

Figure 1:
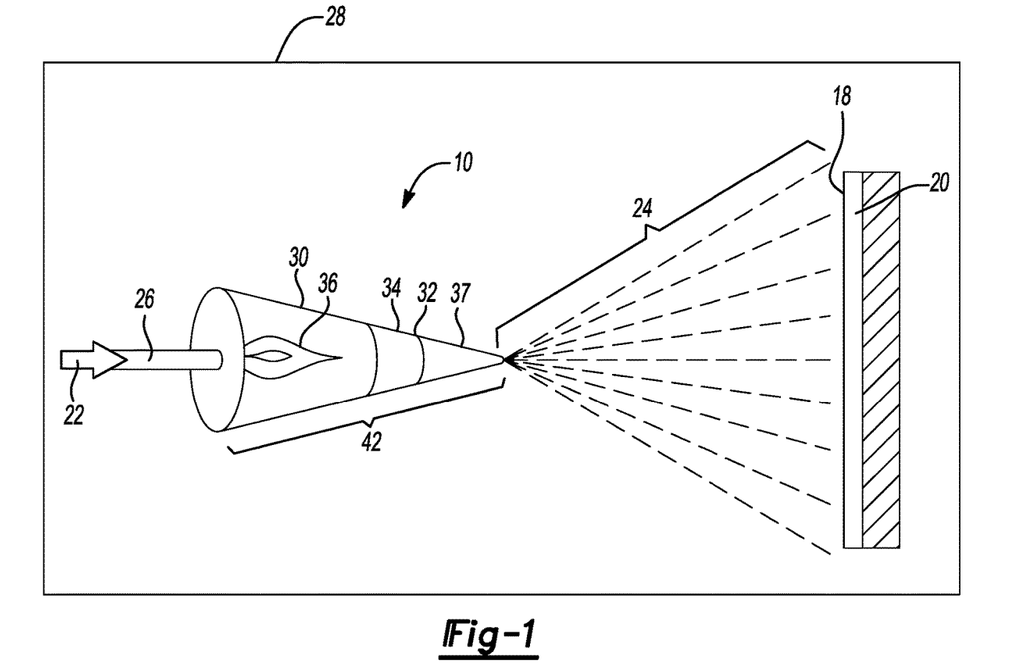
FIG. 1 shows an exemplary plasma reactor for performing pretreatment with a reducing plasma gas according to certain aspects of the present disclosure.

Referring now to FIG. 1, an example of a plasma treatment system 10 for treating a surface 18 of a negative metal current collector 20 is shown, although various plasma treatment systems 10 may vary in components and configuration. A plasma energy source 42 is activated to generate a plasma jet 24. In an example, any suitable plasma device may be used as the plasma energy source 42. The plasma energy source 42 is contained in a plasma reaction chamber 28. It should be noted that when a low pressure plasma system is used, it requires that the plasma system be located in a dry room or glove box to avoid exposure to humidity and oxygen. The plasma energy source 42 includes a plasma flame 36 (generated in a plasma vaporization chamber 30, which can be a combustion or ionization chamber for the flame 36), as well as a quenching area 34, and a cooling train 32.

In the system 10, a carrier gas 22 is delivered to the plasma reaction chamber 28. Examples of suitable carrier gases 22 include reducing gases or compositions including reducing gases and inert gases. For example, the carrier gas 22 may include a reducing plasma gas having a reducing molecule selected from the group consisting of: hydrogen gas ($H_2$), ammonia ($NH_3$), and combinations thereof. The carrier gas 22 may also comprise an inert molecule selected from the group consisting of: argon (Ar), helium (He), nitrogen gas ($N_2$), and combinations thereof. As examples, plasma containing gas compositions of $Ar-N_2$, $N_2-H_2$, $Ar-H_2$, and/or $NH_3$ can be used as the carrier gas 22. It is to be understood that other gases, including other inert gases, may be used as the carrier gas 22 as well so long as they are not oxidizing species. The plasma flame 36 is formed using the carrier gas 22 and a power source, such as a microwave, a direct current (DC), an alternating current (AC), or a radio frequency (RF) within the plasma vaporization chamber 30. While not shown, electrode(s) within the plasma vaporization chamber 30 ionize the carrier gas 22 to form the plasma jet 24.

The carrier gas 22 is delivered to the plasma chamber 28 via a delivery mechanism 26. The delivery mechanism 26 may be any suitable polymeric, glass, stainless steel, copper, or other type of tubing. The stream(s) of carrier gas 22 is/are transported as from a gas source based due to pressure differentials.

The temperature of the plasma vaporization chamber 30 may be controlled by controlling the temperature of the plasma flame 36. The temperature of the plasma flame 36 may be controlled by altering/adjusting the power coupled into the plasma vaporization chamber 30 by the microwave, direct current (DC), alternating current (AC), or radio frequency (RF). In certain aspects, the plasma energy source 42 may be a high energy plasma generated by a microwave plasma source, a low pressure plasma, an inductively coupled plasma, and combinations thereof Examples of the parameters of the plasma energy source 42 that may be adjusted include the type of generator of the plasma, nozzle diameter, nozzle height, nozzle speed, flow rates, temperatures, plasma voltage, plasma current, plasma power, and/or plasma cycle time, by way of example. However, such parameters may not be pertinent in all plasma energy systems. For example, when the system employs microwave plasma, a nozzle is not used. Instead, the plasma is created in a vacuum chamber.

In an example, the voltage applied to electrodes (not shown) of the plasma energy source 42 can range from greater than or equal to about 130 volts to less than or equal to about 250 volts. In one variation, the temperature of the plasma flame 36 ranges from about 500° C. to about 5,000° C., and the temperature of the plasma vaporization chamber 30 ranges from about 300° C. to about 1,000° C.

The plasma flame 36 accelerates the plasma jet 24 into the quenching area 34 and then into the cooling train 32. At the quenching area 34 and within the cooling train 32, the plasma jet 24 is exposed to a much lower temperature than the plasma flame temperature in the plasma reaction chamber 28. This lower temperature may be at or less than ambient or room temperature (e.g., less than about 22° C.). This causes the plasma jet 24 to cool before it treats the surface 18 of the current collector 20.

The plasma jet 24 is thus projected through the plasma nozzle 37 toward the surface 18 on the current collector 20. It is to be understood that the plasma nozzle 37 has an aperture adapted to effectively deliver the plasma jet 24 to all areas of the surface 18 of the current collector 20. As noted above, not all plasma treatment systems employ the plasma nozzle 37. In an example, the plasma jet 24 is projected out the plasma nozzle 37 at a velocity (rastering speed) up to about 20 mm/second. In addition, the temperature of plasma jet 24 may range from about 20° C. to about 100° C. in certain variations. It is to be understood that the temperature and velocity of the plasma jet 24 can contribute to high energy atmospheric plasma, which reacts with and treats the surface 18 of the current collector 20.

The distance between the end of the plasma nozzle 37 and the surface 18 of the current collector 20 may range from greater than or equal to about 1 cm to less than or equal to about 50 cm, optionally from greater than or equal to about 5 cm to less than or equal to about 10 cm. The plasma jet 24 can be directed at the surface for a duration of greater than or equal to about 1 minute, optionally greater than or equal to about 2 minutes, optionally greater than or equal to about 3 minutes, optionally greater than or equal to about 4 minutes, optionally greater than or equal to about 5 minutes, optionally greater than or equal to about 6 minutes, optionally greater than or equal to about 7 minutes, optionally greater than or equal to about 8 minutes, optionally greater than or equal to about 9 minutes, optionally greater than or equal to about 10 minutes, optionally greater than or equal to about 15 minutes, optionally greater than or equal to about 20 minutes, optionally greater than or equal to about 25 minutes, and in certain variations, optionally greater than or equal to about 30 minutes.

A high energy plasma is one that has a high voltage and/or high frequency and thereby higher energetics with electrons and free atoms, as discussed above. In certain variations, the plasma treatment may have a power level of greater than or equal to about 50 W to less than or equal to about 5,000 W and may be conducted for a time of greater than or equal to about 1 minute to less than or equal to about 10 minutes. Where the plasma treatment is a high energy treatment, it may have a power level of greater than or equal to about 100 W to less than or equal to about 5,000 W and may be conducted for a time period of greater than or equal to about 1 minute to less than or equal to about 10 minutes. In one aspect, the treating of the surface 18 of the current collector 20 with a reducing plasma gas may be conducted with a high energy plasma generated by a 13.56 MHz radio frequency (RF) plasma source or a 2.48 GHz microwave plasma source, by way of example.

After the surface 18 of the current collector 20 has been treated, the plasma energy source 42 can be activated to cease generation of the plasma jet 24. As shown in FIG. 1, the treated current collector 20 is disposed on a heated stage (not shown), where heat may be applied through the current collector 20 towards treated surface 18. Next, a lithium metal source can be disposed on the treated surface 18, for example, while the treated current collector 20 remains in the plasma reaction chamber 28. The lithium metal can be deposited to a desired thickness by melting on the high surface energy current collector (e.g., treated copper foil). A plasma-treated clean surface (e.g., treated copper foil) enhances wettability and allows for lithium to flow and deposit as a thin film. As discussed above, the plasma reaction chamber 28 is substantially free of oxidizing species during the applying process.

A lithium metal source, which may be a layer of lithium metal like a thin film or foil, may be cleaned prior to placement on the surface 18 of the current collector 20. Lithium metal is relatively soft and as discussed above, highly reactive, especially with oxidizing species. Thus, blasting with loose and hard abrasives may not be suitable for cleaning the lithium metal source. In view of the reactivity of lithium metal, protic solvents (e.g., alcohols, acetone, ethers, and the like) may likewise be avoided when cleaning or treating. A suitable cleaning process may include by way of non-limiting example, wiping the surface with an aprotic solvent, such as hexane, or other cleaning techniques that are gentle and avoid reaction with the lithium, which are known in the art.

Figure 2:
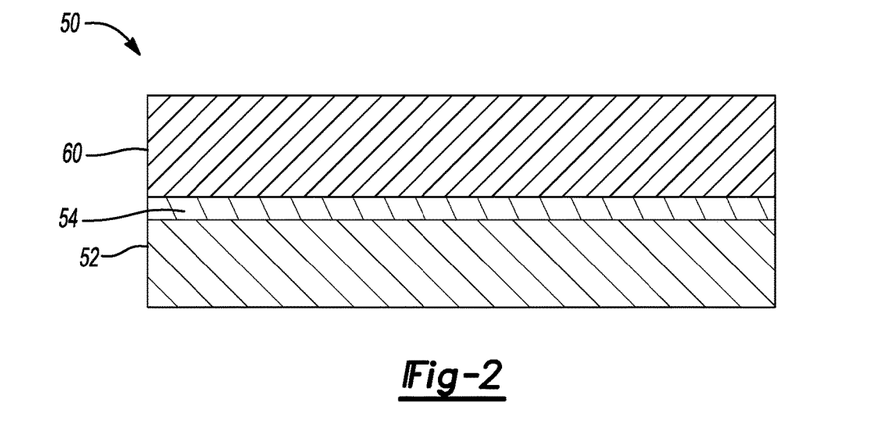
FIG. 2 shows a sectional view of an example of a lithium-based negative electrode assembly formed in accordance with certain aspects of the present disclosure.

Referring now to FIG. 2, a lithium-based negative electrode 50 is shown that is formed by methods according to the present disclosure. The lithium-based negative electrode 50 includes a negative metal current collector 52 having a treated surface region 54. In certain variations, the current collector 52 is a film or foil having a thickness of greater than or equal to about 2 µm to less than or equal to about 30 µm. The thickness of the treated surface region 54 depends on a number of passes and duration of exposure to the plasma spray, which depends at least in part on the plasma process parameters during treatment. As such, multiple passes of the plasma spray may be employed to achieve removal of a certain level of metal oxides to a desired thickness and to ensure the desired level of reduction of nucleation potential and surface energy modification/contact angle reduction. In an example, the thickness of the treated surface region 54 may range from greater than or equal to about 1 micrometer to less than or equal to about 20 micrometers.

A source of lithium metal or a lithium metal layer 60 is disposed on the treated surface region 54 of the negative metal current collector 52. The lithium metal layer 60 applied to the treated surface region 54 of the current collector 52 may be a lithium film or foil having a thickness prior to being applied of greater than or equal to about 5 µm to less than or equal to about 75 µm. As discussed above, due to the plasma-treatment on the current collector surface (e.g., treated copper foil), nucleation overpotential is reduced and wettability for lithium is enhances so that lithium can flow and deposit as a thin film. The thickness of the lithium metal layer 60 when it is applied during the process may be less than the thickness in situ after cycling of the electrochemical cell, as additional lithium present in the positive electrode material or electrolyte may plate onto the lithium metal layer 60. Thus, the lithium metal layer 60 may be a thin initiator layer or strike-plate layer to promote subsequent growth of the lithium (that migrates from the active material and/or electrolyte within the electrochemical cell).

Thus, the present disclosure contemplates an electrochemical cell that comprises a lithium-based negative electrode assembly formed by the methods described above. The lithium-based negative electrode includes a metal current collector comprising a metal selected from the group consisting of: copper (Cu), nickel (Ni), iron (Fe), and combinations thereof having a surface that has been treated with a reducing plasma gas. The lithium-based negative electrode also includes a negative electroactive layer comprising lithium disposed on the surface of the metal current collector. The electrochemical cell may further comprise a positive electrode, a separator, and an electrolyte that comprises a lithium salt. In certain aspects, the electrochemical cell is capable of maintaining at least 85% of its charge capacity (after the initial charge and discharge cycle) for greater than or equal to at least about 500 hours of operation.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this invention have, or have not, been made or tested.

EXAMPLE A

In one example, a lithium-based negative electrode is prepared in accordance with certain aspects of the present disclosure as follows. A copper foil having dimensions of 100 mm by 100 mm and a thickness of 10 micrometers (µm) commercially available from Hoshen is used as a current collector. The copper foil is introduced into a reactor chamber of a plasma reactor that generates high energy plasma via a 2.48 GHz microwave plasma source P400. The reactor chamber is filled with argon gas and is in a vacuum free of oxidizing species. A reducing carrier gas having a composition of $H_2/Ar$ in 50 sccm Ar and 10 sccm $H_2$ ratio is introduced into the reactor chamber of the plasma reactor. For the microwave plasma, a nozzle is not used. The plasma generation is done in a vacuum chamber with gas flows as mentioned above at 300 W for time ranges of greater than or equal to about 1 minute to less than or equal to about 10 minutes. The power can be greater than or equal to about 50 W to less than or equal to about 500 W. In this manner, the surface of the copper foil is pretreated with a reducing plasma gas to enhance the reduce nucleation overpotential, reduce copper oxides, and enhance the ability of bonding with lithium metal.

Figure 3:
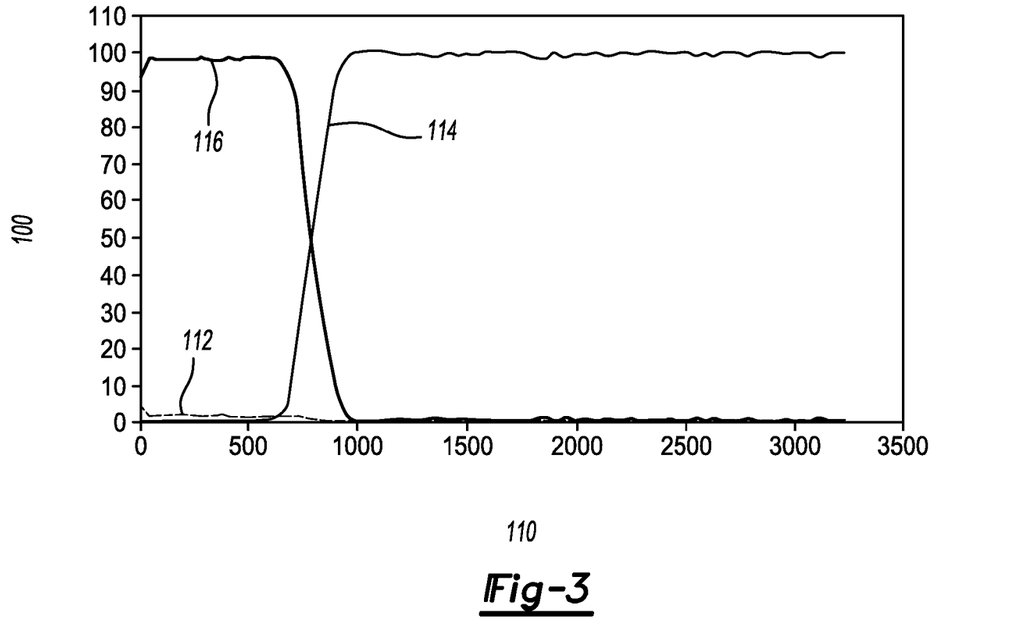
FIG. 3 shows an X-ray photoelectron spectroscopy (XPS) graph with depth profiling to determine the surface layer composition and thickness of a plasma-treated copper foil prepared in accordance with certain aspects of the present disclosure.

A sample is prepared for XPS analysis having a depth profile as shown in FIG. 3 (y-axis labeled 100 is atomic concentration (%) versus x-axis labeled 110 is sputter depth (nm)). After the copper foil is treated with microwave plasma, it is coated with a graphitic carbon layer having a thickness of about 200 nanometers to protect an interface for XPS processing. Oxygen 1S is labeled as 112, copper 2P is labeled as 114, and carbon 1S is labeled as 116. As can be seen, below a sputter depth of about 500 nm, the atomic concentration of oxygen 112 representing metal oxides is below about 5%.

Contact angles are also measured for comparison of the copper current collector before and after the treatment with plasma reducing gas to show the enhancement/reduction in surface energy that improves wettability and adhesion of a plasma treated copper foil with a lithium metal. The contact angle maybe a static contact angle, where a sessile drop measurement technique using a 5 microliter drop is disposed on the surface and measured. Prior to any treatment, the copper foil has a contact angle of about 58°. After plasma treatment described above, the treated surface of the copper foil has a contact angle of less than 10°.

EXAMPLE B

After treating the copper foil with a reducing plasma gas in the reactor chamber of the 2.48 GHz microwave plasma reactor described in Example A, introduction of the reducing carrier gas and generation of the plasma is discontinued. The plasma treated current collector is disposed on a stage that is heated to about 50° C. A lithium foil having dimensions of dimensions of 25 mm by 25 mm and a thickness of 1 mm commercially available from FMC Lithium is used as a source of lithium metal that will form the electroactive material layer. The lithium foil is untreated and provided in the inert atmosphere of the reactor chamber (filled with argon gas and free of any oxidizing species). The lithium foil is brought into contact with the plasma treated surface of the copper current collector to form Sample A. The lithium is placed on the heated copper foil and starts to flow. No pressure is applied in this example.

EXAMPLE C

Sample A having a surface pretreated with reducing plasma gas and lithium metal applied thereto is incorporated as a first electrode into a first battery test Li//Cu cell. The first battery is a coin cell with a capacity about 1 mAh. The counter electrode is a lithium metal foil (having a thickness of about 250 μ). An electrolyte comprises 1M LiTFSI-DME:DIOX (v:v 1:1) with 2% $LiNO_3$ as additive and a separator is disposed between the negative electrode and the counter electrode.

Comparative Example D

A copper foil having dimensions of 12.5 mm in diameter and a thickness of 18 μm commercially available from Hoshen is used as a comparative current collector (Comparative Sample B). Comparative Sample B is incorporated as a first electrode into a second battery test cell without any pretreatment. The counter electrode is a lithium self-stand metal foil with a thickness of 250. It is not been treated and works as counter electrode. An electrolyte comprises 1M LiTFSI-DME:DIOX (v:v 1:1) with 2% $LiNO_3$ as additive and a separator is disposed between the negative electrode and the counter electrode. During the first cycle, lithium from the counter-electrode plates the untreated copper current collector.

EXAMPLE E

FIG. 4 compares voltage performance for charging and discharging over time for the first battery test cell having Sample A and the second battery test cell having Comparative Sample B. The first and second batteries are coin cells with a capacity about 1 mAh. The Li//Cu coin cell has been cycled with 250 μA charge/discharge rate for four hours at 25° C. In FIG. 4, the y-axis is voltage (V) labeled 150, while the x-axis is time (hours) is labeled 152. Sample A is labeled 160, while Comparative Sample B is labeled 162. As can be seen, the voltage performance over time is improved for Sample A (160) (the copper current collector that has been plasma treated) in that the whole voltage plateau is relatively flat as compared to the performance of Comparative Sample B (162), which indicates a smooth lithium plating on the copper foil for Sample A. Furthermore, the first cycle of lithium stripping/plating is higher for the Cu with plasma treating of Sample A, as compared to the non-treated Comparative Sample B, namely 96.2% versus 95.9%.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a lithium-based negative electrode comprising:
   treating a surface of a metal current collector with a reducing plasma gas so that after the treating, a treated surface of the metal current collector is formed that has a contact angle of less than or equal to about 10° and has less than or equal to about 5% metal oxides, wherein a metal in the metal current collector is selected from the group consisting of: copper (Cu), nickel (Ni), iron (Fe), and combinations thereof, wherein the metal current collector is a film or foil having a thickness greater than or equal to about 2 μm to less than or equal to about 30 μm; and
   applying lithium metal to the treated surface of the metal current collector in an environment substantially free from oxidizing species, wherein the lithium metal flows over and adheres to the treated surface to form a layer of lithium thus forming the lithium-based negative electrode, wherein the layer of lithium is a lithium film or foil having a thickness of greater than or equal to about 5 μm to less than or equal to about 75 μm, and wherein during at least a portion of the applying, an external pressure is applied to the layer of lithium.

2. The method of claim 1, wherein the reducing plasma gas comprises a molecule selected from the group consisting of: argon (Ar), nitrogen ($N_2$), hydrogen gas ($H_2$), ammonia ($NH_3$), and combinations thereof.

3. The method of claim 1, wherein the treating of the surface with the reducing plasma gas employs a plasma source selected from the group consisting of: a high energy plasma generated by a microwave plasma source, a low pressure plasma, an inductively coupled plasma, and combinations thereof.

4. The method of claim 1, wherein after the treating and prior to the applying, the metal current collector is disposed on a heated stage having a temperature of greater than or equal to about 50° C. to less than or equal to about 120° C.

5. The method of claim 1, wherein the treating and the applying are conducted in the same reaction chamber.

6. The method of claim 1, wherein the treating the surface of the metal current collector with the reducing plasma gas is conducted with a high energy plasma generated by a 13.56 MHz radio frequency (RF) plasma source or a 2.48 GHz microwave plasma source.

7. The method of claim 1, wherein the external pressure is applied for a duration greater than or equal to about 15 minutes to less than or equal to about 60 minutes.

8. The method of claim 1, wherein the external pressure is greater than or equal to about 0.1 MPa to less than or equal to about 40 MPa.

9. The method of claim 8, wherein the external pressure is greater than or equal to about 10 MPa to less than or equal to about 30 MPa.

10. A method of forming a lithium metal negative electrode comprising:
    treating a surface of a current collector comprising copper with a reducing plasma gas so that after the treating, a treated surface of the current collector has a contact angle of less than or equal to about 10° and has less than or equal to about 5% copper oxides;

heating the current collector having the treated surface to a temperature of greater than or equal to about 50° C. to less than or equal to about 120° C.; and applying lithium metal to the treated surface of the current collector in an environment that is substantially free from oxidizing species and has a water content of less than or equal to about 1% by mass, wherein the lithium metal flows over and adheres to the treated surface to form a layer of lithium having a thickness of greater than or equal to about 1 micrometer (μm) to less than or equal to about 75 μm so as to form the lithium metal negative electrode, and wherein during at least a portion of the applying, an external pressure is applied to the layer of lithium.

11. The method of claim 10, wherein the reducing plasma gas has a composition comprising a molecule selected from the group consisting of: argon (Ar), nitrogen ($N_2$), hydrogen gas ($H_2$), ammonia ($NH_3$), and combinations thereof.

12. The method of claim 10, wherein the treating of the surface with the reducing plasma gas employs a plasma source selected from the group consisting of: a high energy plasma generated by a microwave plasma source, a low pressure plasma, an inductively coupled plasma, and combinations thereof.

13. The method of claim 10, wherein the treating and the applying are conducted in the same reaction chamber.

14. The method of claim 10, wherein the treating the surface of a metal current collector with a reducing plasma gas is conducted with a high energy plasma generated by a 13.56 MHz radio frequency (RF) plasma source or a 2.48 GHz microwave plasma source.

15. The method of claim 10, wherein the current collector is a film or foil having a thickness of greater than or equal to about 2 μm to less than or equal to about 30 μm and the layer of lithium applied to the treated surface of the current collector is a lithium film or foil having a thickness of greater than or equal to about 5 μm to less than or equal to about 75 μm.

16. The method of claim 10, wherein the external pressure is applied for a duration greater than or equal to about 15 minutes to less than or equal to about 60 minutes.

17. The method of claim 10, wherein the external pressure is greater than or equal to about 0.1 MPa to less than or equal to about 40 MPa.

18. The method of claim 17, wherein the external pressure is greater than or equal to about 10 MPa to less than or equal to about 30 MPa.

* * * * *